United States Patent
Gong et al.

(10) Patent No.: US 12,555,285 B2
(45) Date of Patent: Feb. 17, 2026

(54) USER INTENTION ORIENTED RESPONSIVE DESIGN FOR APPLICATIONS RUNNING ON MULTIPLE DEVICES

(71) Applicant: SAP SE, Walldorf (DE)

(72) Inventors: Zhiyong Gong, Shanghai (CN); Jiandong Shi, Shanghai (CN); Yizhen Yang, Shanghai (CN); Xiaoliang Shi, Shanghai (CN); Shaowei Wu, Shanghai (CN); Zheng Wang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/299,580

(22) Filed: Apr. 12, 2023

(65) Prior Publication Data
US 2024/0346721 A1   Oct. 17, 2024

(51) Int. Cl.
*G06T 11/60*  (2006.01)
*G06F 8/20*  (2018.01)
*G06F 8/38*  (2018.01)
*G06F 40/143*  (2020.01)
*G06T 7/70*  (2017.01)

(52) U.S. Cl.
CPC ............ *G06T 11/60* (2013.01); *G06F 8/20* (2013.01); *G06F 8/38* (2013.01); *G06F 40/143* (2020.01); *G06T 7/70* (2017.01)

(58) Field of Classification Search
CPC ... G06T 11/60; G06T 7/70; G06F 8/20; G06F 8/38; G06F 40/143
See application file for complete search history.

(56) References Cited

U.S. PATENT DOCUMENTS

| | | | |
|---|---|---|---|
| 10,678,521 B1* | 6/2020 | Krishnamoorthy | G06N 3/045 |
| 2002/0041289 A1* | 4/2002 | Hatch | G06F 9/45512 715/762 |
| 2011/0010645 A1* | 1/2011 | Mihalcea | G06F 8/38 715/768 |
| 2015/0347097 A1* | 12/2015 | Cathey | G06F 3/0481 715/763 |
| 2017/0123641 A1* | 5/2017 | Lance | G06F 8/30 |
| 2019/0018660 A1* | 1/2019 | Ananthapur Bache | G06F 8/34 |
| 2020/0133692 A1* | 4/2020 | Rohde | G06F 9/451 |
| 2021/0096704 A1* | 4/2021 | Ericsson | G06F 3/04817 |
| 2021/0406040 A1* | 12/2021 | Kuduvalli | G06F 8/38 |

* cited by examiner

*Primary Examiner* — Keith D Bloomquist
(74) *Attorney, Agent, or Firm* — Mintz Levin Cohn Ferris Glovsky and Popeo, P.C.

(57) ABSTRACT

In some implementations, there is provided a method including identifying, from an electronic drawing, at least one object and at least one object location in at least one user intention for a user interface that is responsive across a plurality of screen sizes, wherein the at least one object and the at least one object location are identified using a machine learning model; creating responsive rules for the at least one object and at least one object location detected in the at last one user intention; and rendering, based on the responsive rules, the user interface, such that the responsive rules configure content layout in the user interface in response to a screen size displaying the user interface. Related systems, methods, and articles of manufacture are also disclosed.

20 Claims, 16 Drawing Sheets

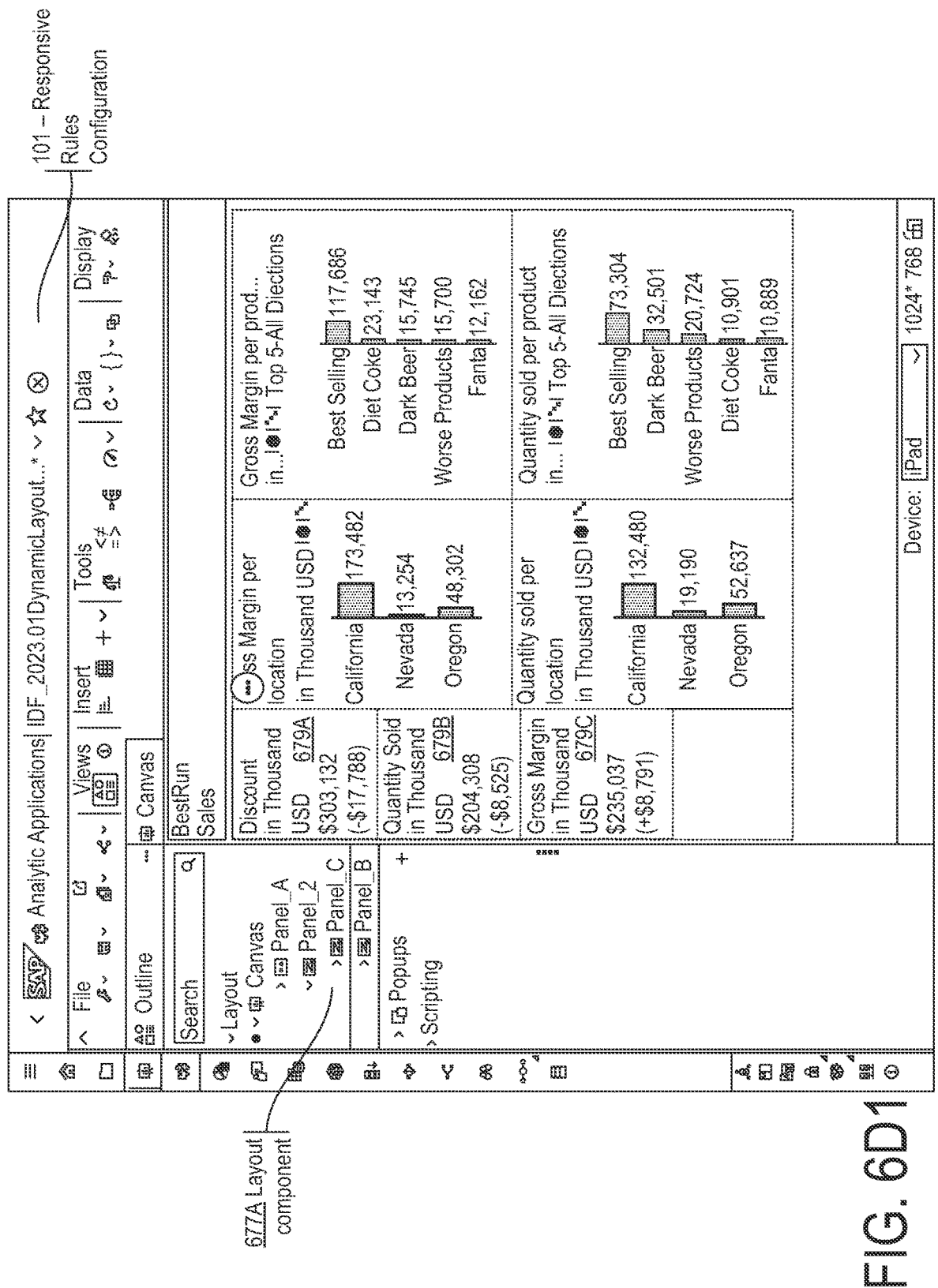
FIG. 6D1

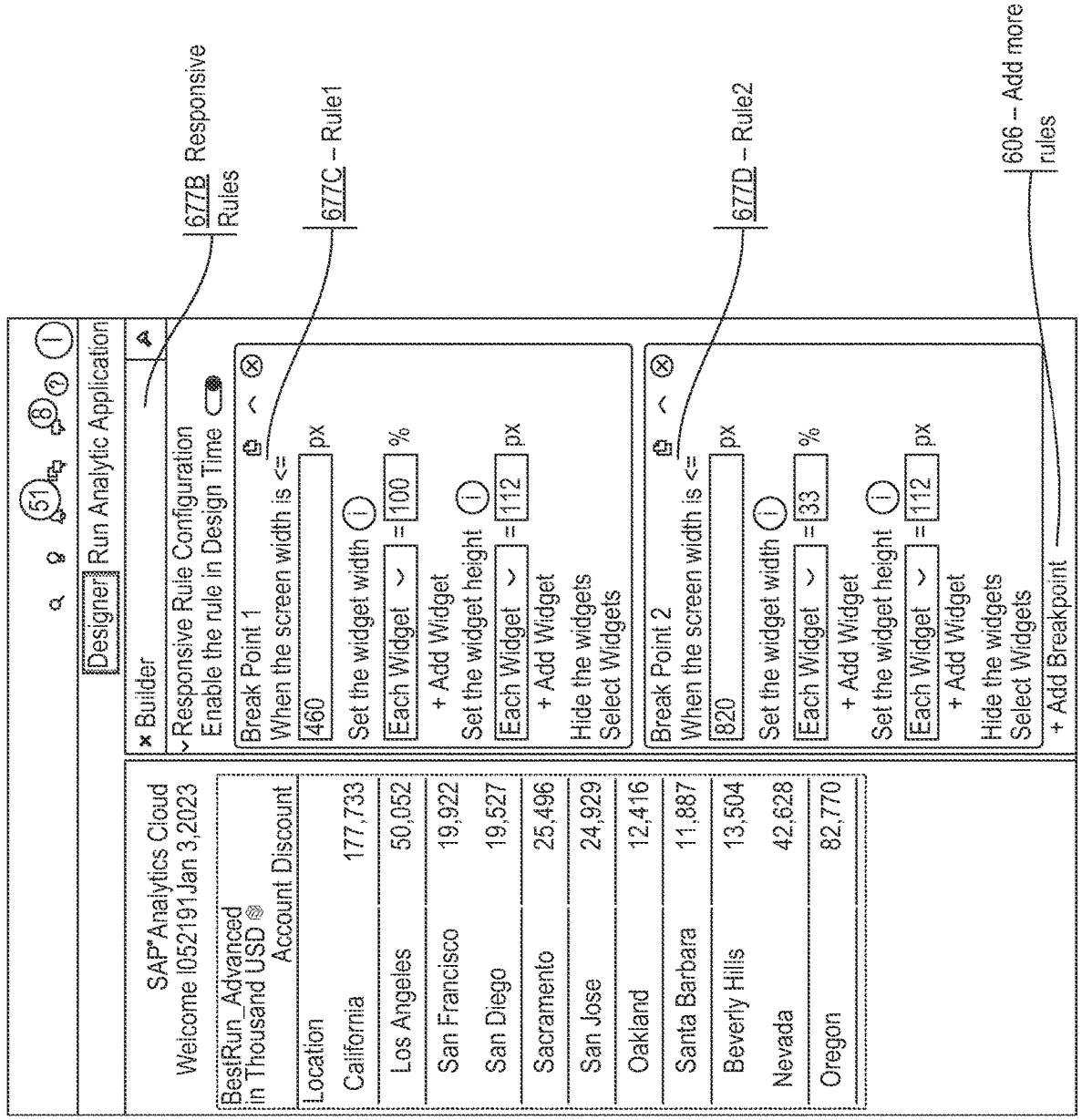
FIG. 6D1(Con't)

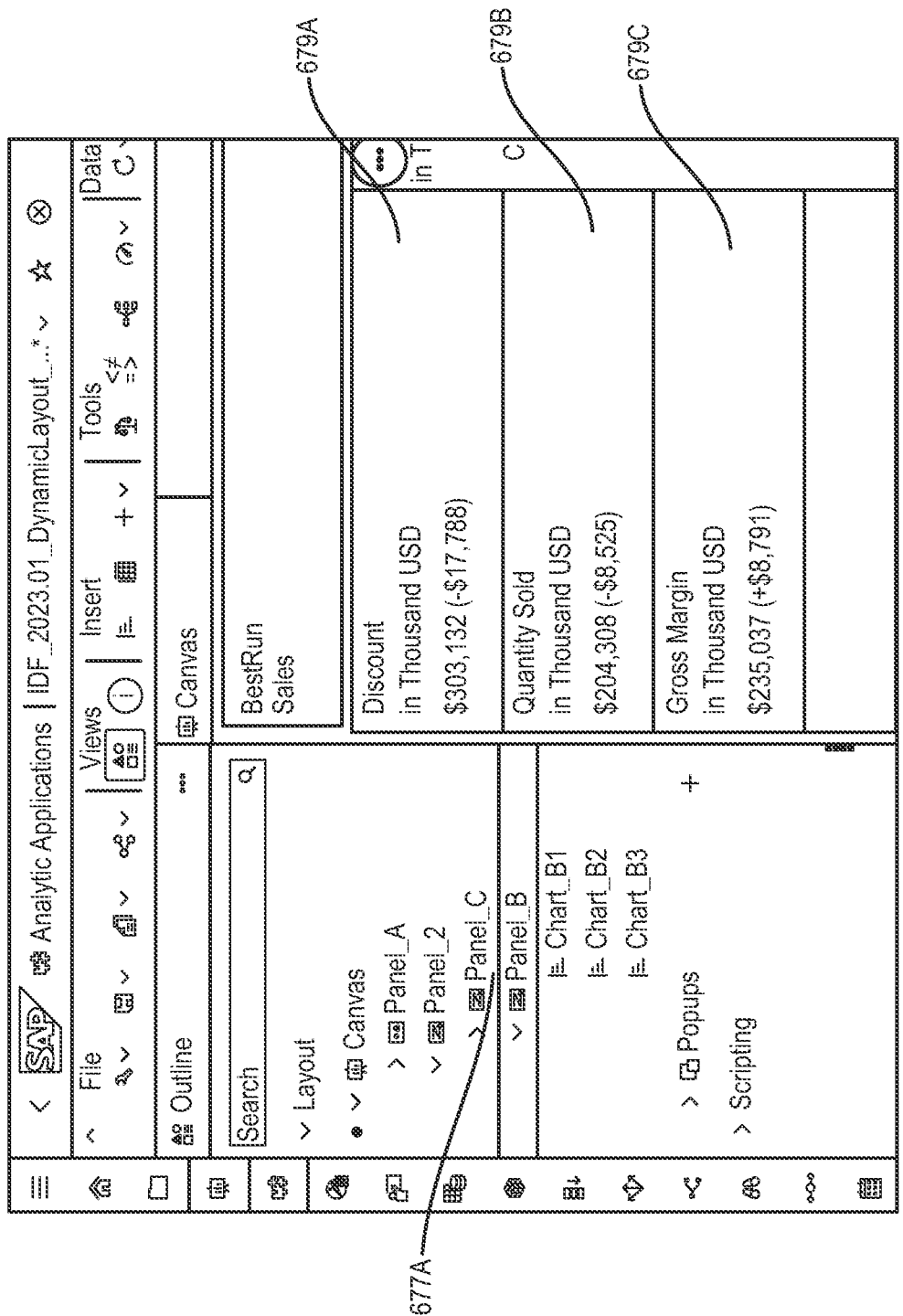
FIG. 6D2

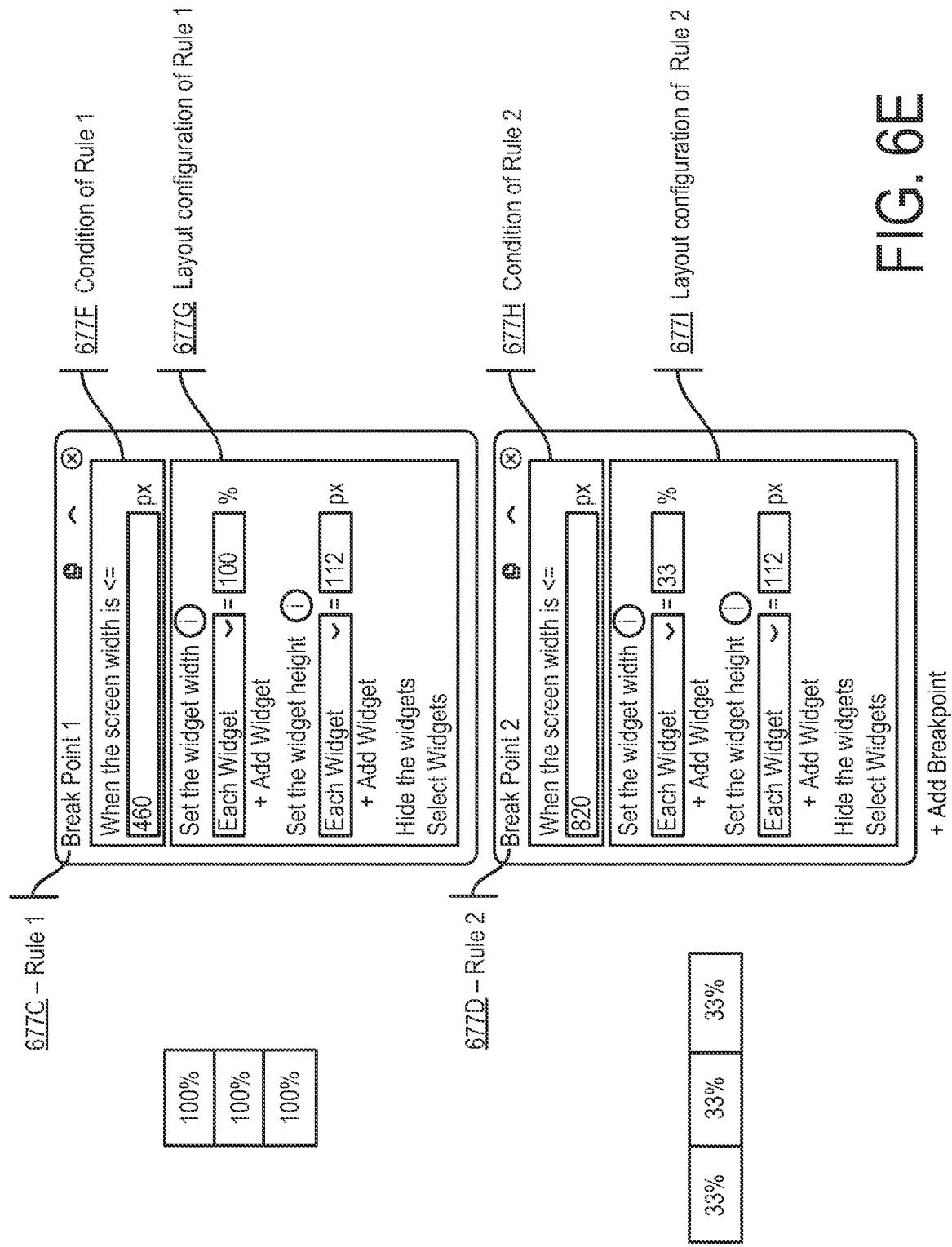

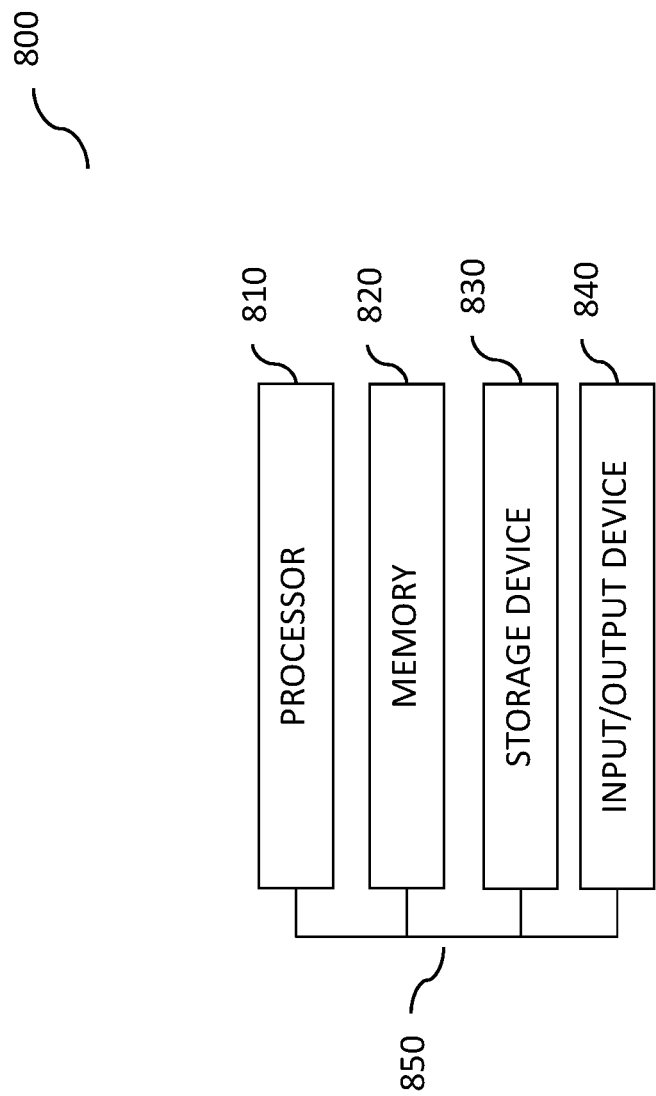

USER INTENTION ORIENTED RESPONSIVE DESIGN FOR APPLICATIONS RUNNING ON MULTIPLE DEVICES

TECHNICAL FIELD

This disclosure relates generally to user interface development and design.

BACKGROUND

When designing and implementing user interfaces, the user interfaces may be implemented across a wide variety of devices having for example different display or screen sizes, such as different horizontal and vertical dimensions. For example, a user interface may be expected to operate across relatively large displays screens, such as those found on a desk or laptop, to midsize display screens, such as those found in tablets, and small display screens, such as those found in smartphones. This variety makes controlling the deployment experience of a user interface a technical challenge for developers.

SUMMARY

In some implementations, there is provided a computer-implemented method including identifying, from an electronic drawing, at least one object and at least one object location in at least one user intention for a user interface that is responsive across a plurality of screen sizes, wherein the at least one object and the at least one object location are identified using a machine learning model; creating responsive rules for the at least one object and at least one object location detected in the at last one user intention; and rendering, based on the responsive rules, the user interface, such that the responsive rules configure content layout in the user interface in response to a screen size displaying the user interface.

In some variations, one or more of the features disclosed herein including the following features can optionally be included in any feasible combination. The at least one user intention defines at least a placement of a content within the user interface, wherein the content comprises a widget, a user interface element, and/or a user interface object. The scanning is performed by a user device and provided to a user intention builder, wherein the user intention builder causes at least the identifying, the creating, and the rendering. The scanning is performed by a user intention builder, wherein the user intention builder causes at least the receiving, the scanning, the identifying, the creating, and the rendering. The identifying the at least one object and the at least one object location in the at least one user intention further comprises mapping the at least one object and the at least one object location to at least one content. The machine learning model identifies the at least one object using a convolutional neural network. The machine learning model comprises a regional proposal network to identify the at least one object and the at one location. At least one modification to the at least one user intention may be received, wherein the modification comprises a change in a location of the at least one object within the user interface. The at least one object includes a shape, a label, a size of the shape, a size of the label, and/or a position for the objects. The rendering includes generating a container widget based on the responsive rules. The rendering includes generating a cascading style sheet based on the responsive rules.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6D1-6D2 depict examples of how the responsive rules layout the content for the user interface components, in accordance with some embodiments;

FIG. 6E depicts an example of responsive rules, in accordance with some embodiments;

FIG. 8 depicts an example of a system, in accordance with some embodiments.

DETAILED DESCRIPTION

In the field of user interface design and development, the phrase "responsive design" refers to an application design, such as a user interface, a web site, and/or the like, that is responsive to the system environment in which the application is viewed. In the case of responsive design, if a smartphone accesses a website, the smartphone is provided with user interfaces that correspond to the smartphone, rather than for example a desktop oriented series of user interfaces. To provide this, the website may include cascading style sheets (CSS) and markup language (e.g., HTML) features and techniques.

For a less sophisticated end-user designer, such as a business end-user accessing for example applications for reporting, dashboards, analytical applications, and/or low code-no code application builder tools (e.g. SAP Analytics Cloud, SAP Crystal Xcelsius, and/or the like), the less sophisticated end-user designer may face challenges when creating their own applications having a responsive design, without this less sophisticated end-user designer having any programming skills in for example CSS and HTML web programming languages. Indeed, this less sophisticated end-user designer may find a technical challenge in providing a responsive design of an application that can cover a wide variety of visual experiences regardless of the size of the user's display and the limitations or capabilities of the device.

Figure 1:
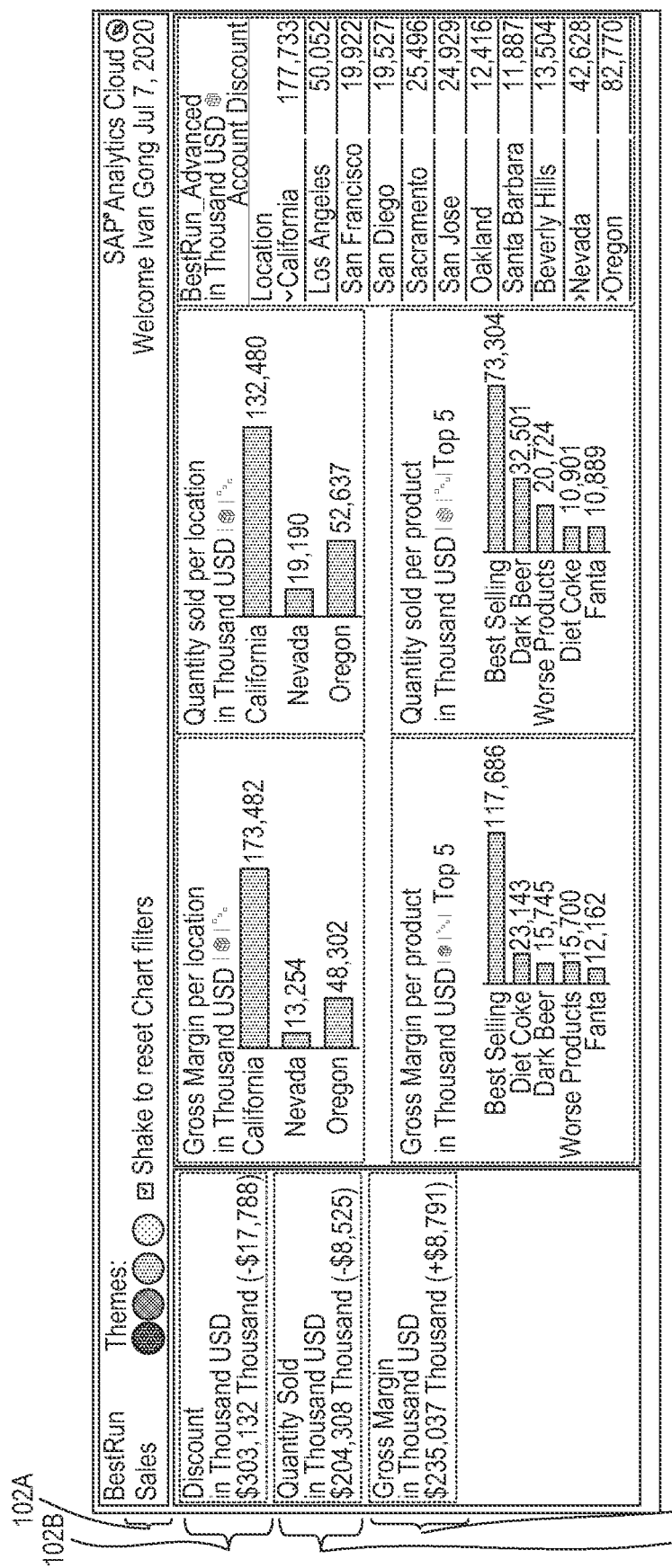
FIGS. 1, 2, and 3 depict examples of responsive designs with respect to three different screen sizes, in accordance with some embodiments.
Figure 2:
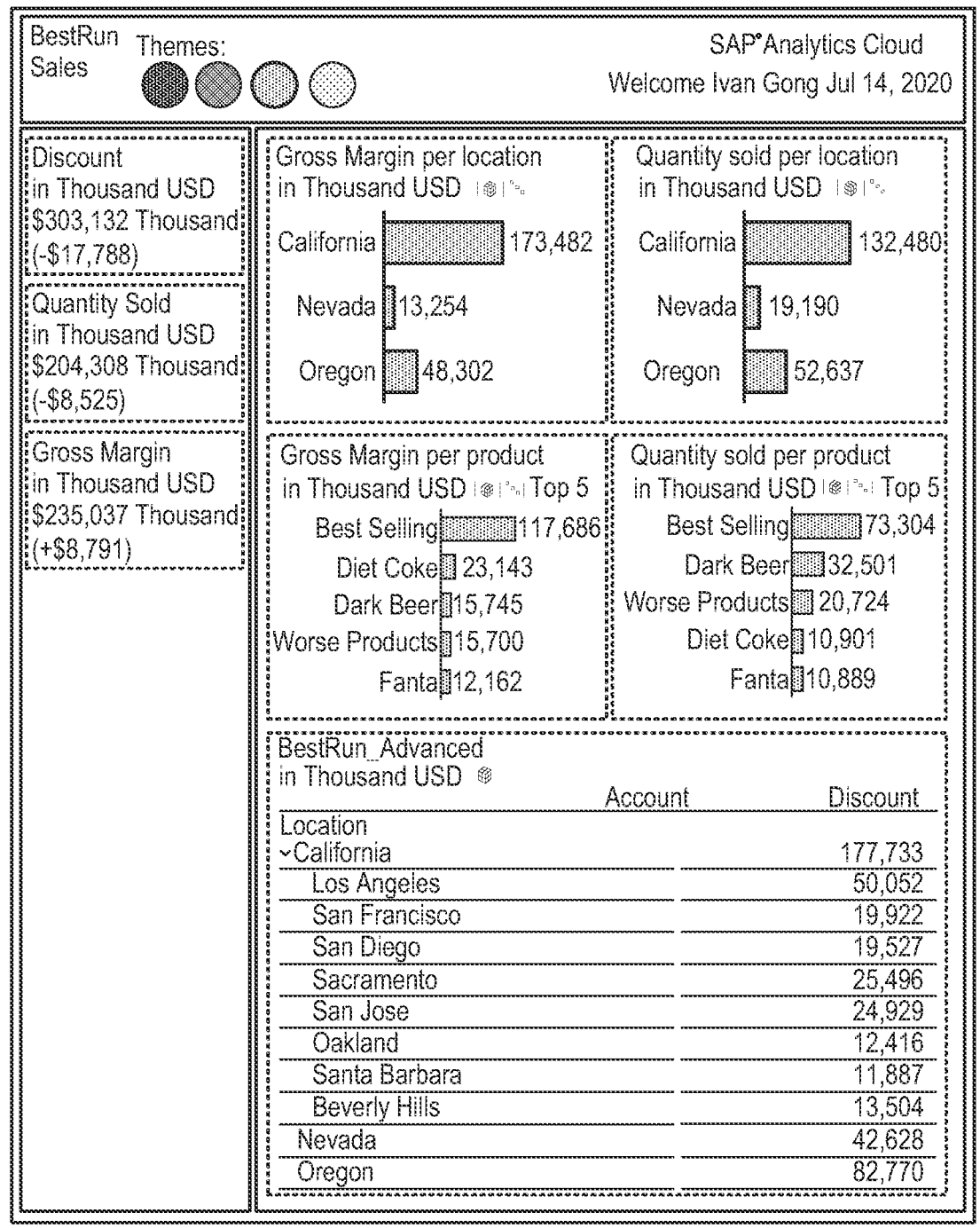
Figure 3:
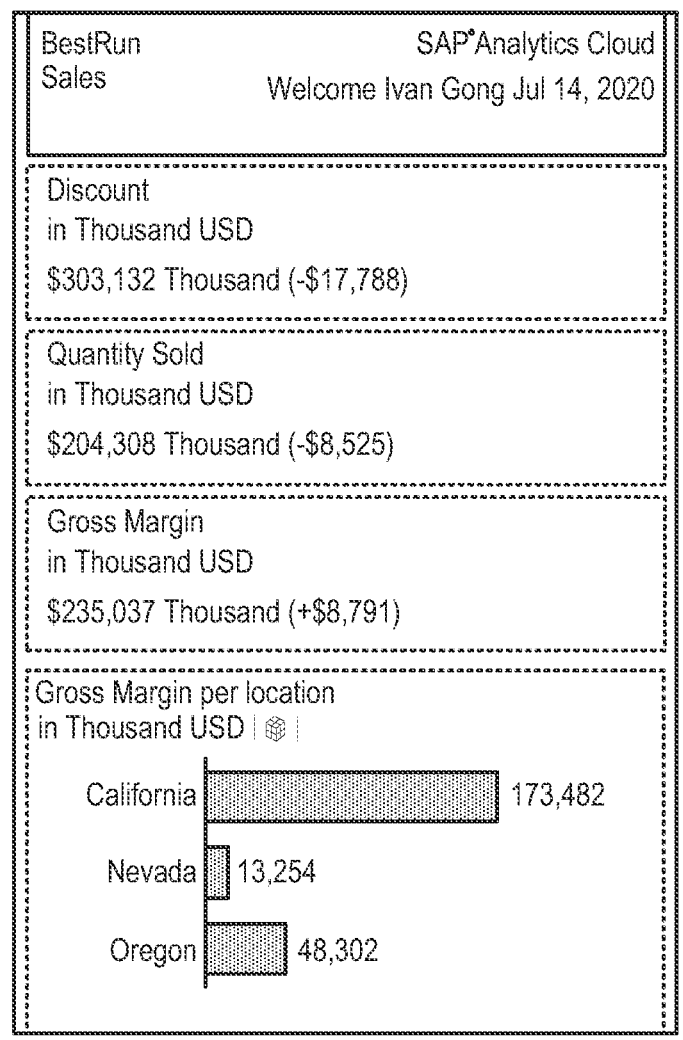

FIGS. 1-3 depict examples of responsive designs with respect to 3 different screen sizes. In the case of FIG. 1 for example, the display screen width may be greater than a threshold amount such as 820 pixels, so FIG. 1 may correspond to a desk, a laptop, or a tablet in a horizontal viewing mode. In the case of FIG. 2, the display screen width may be smaller than FIG. 1, such as between a first threshold and a second threshold (e.g., between 460 pixels and 820 pixels), which may correspond to a tablet in a vertical mode, for example. In the case of FIG. 3, the display screen width may be smaller than FIG. 2, such as less than a threshold (e.g., less than 460 pixels), which may correspond to a smartphone, for example. As can be seen, the application (e.g., web or cloud application) being accessed by the different devices of FIG. 1-3 responds with different layouts based on the display size of the end-user's device.

In some embodiments, there is provided a way to convert user intention(s) (with respect to desired behavior of the user interface for different screen sizes) to responsive designs. For example, a user may create one or more user intentions by simply drawing the placement of user interface objects. A machine learning model may then detect these objects from the drawing and use rules responsive to physical screen size (also referred to herein as responsive rules) to generate a user interface page including the user interface objects, such that the generate page includes code including the responsive rules that automatically place the user interface objects on the user interface page based on the physical screen size.

In some embodiments, an end-user may draw or create user intentions (with respect to desired behavior of the user interface of an application across different screen sizes), such that the user intentions are converted to rules that can be applied to layout components across the different sized screens. Moreover, the end-user may adjust (or revise) the rules. The rules may also be referred to as "responsive rules" as the rules are for the responsive design and thus responsive to the different physical screen sizes.

In some embodiments, the user may draw (or sketch) user intentions with respect the desired behavior of the application's content on a given user interface for different screen sizes.

Figure 4A:
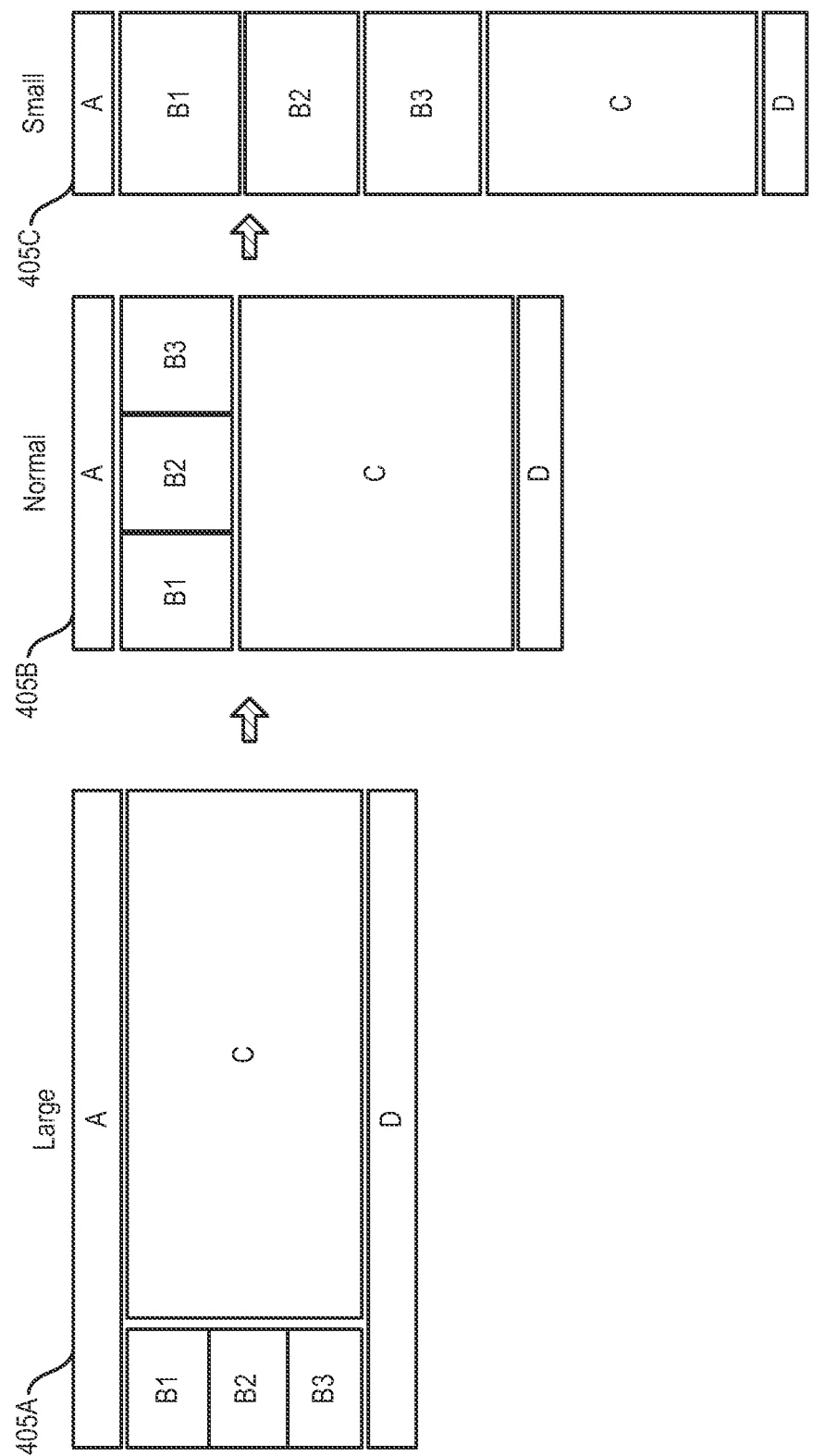
FIGS. 4A-4B depict examples of user intentions for responsive design of user interfaces, in accordance with some embodiments.

FIG. 4A depicts an example of a sketch, which can be drawn on paper or drawn (or sketched) electronically. In the example of FIG. 4A, the sketch shows 3 user intentions corresponding to a large user intention 405A for a large display size, to a mid-sized (also referred to as "normal") user intention 405B for a mid-sized display size, and a small user intention 405C for a small display size. Although this example refers to three user intentions corresponding to three different sized displays, other quantities of user intentions and corresponding display sizes may be used implemented as well.

Referring to 405A for the large display screen user intention, the user intention defines a placement of specific content A, a placement of specific content B1-B3, a placement of specific content C, and a placement of specific content D. For example, the content A may correspond to content, such as a panel, a widget, a user interface element (or object), and/or the like. Referring to FIG. 1 for example, the content A may map to content 102A, content B1-B3 may map to content 102B-D, and so forth. The mappings may be stored at a system, such as a user intention builder (which is described further below with respect to FIG. 5A).

Referring to again to FIG. 4A at 405B for the mid-sized display screen user intention, the user intention defines a placement of specific content A, a placement of specific content B1-B3, a placement of specific content C, and a placement of specific content D. Likewise, for the small display screen user intention 405C, the user intention defines a placement of specific content A, a placement of specific content B1-B3, a placement of specific content C, and a placement of specific content D. As noted, the user intentions 405A-C may be drawn or sketched on paper or electronically (e.g., on a drawing or sketch application). As noted, the mappings may be stored at a system, such as a user intention builder.

Figure 4B:
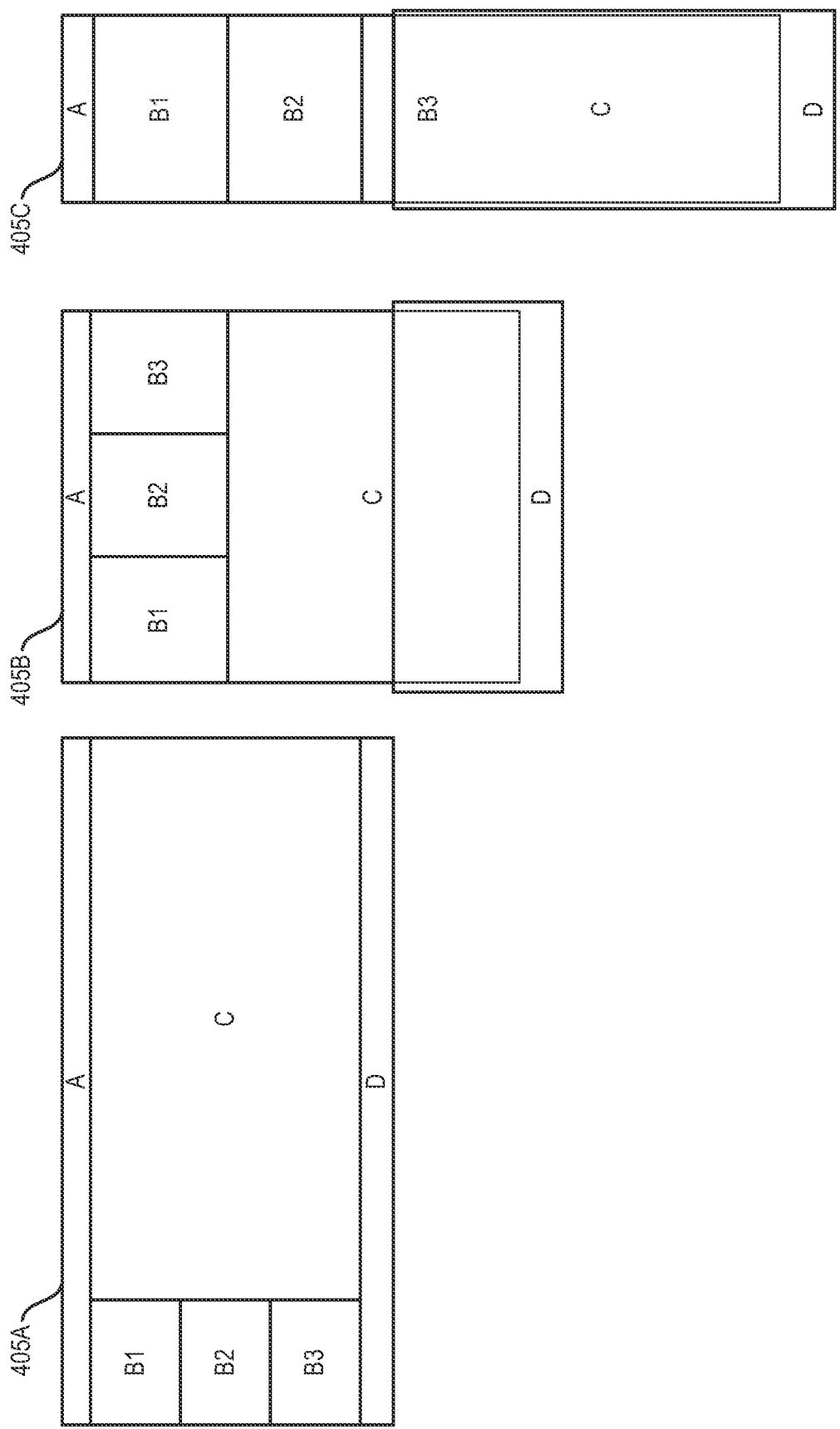

FIG. 4B depicts an example the user intentions 405A-C, but unlike the example of FIG. 4A, the user intentions of FIG. 4B are created electronically using a tool, such as using the user intention builder or other type of tool that allows electronic creation of the user intentions.

In the examples of FIGS. 4A-4B, the user intentions define that the placement of content A and content D are fixed at a position on the top and the bottom of the user interfaces across all screen sizes as shown. Moreover, content B (which includes sub content B1, B2, and B3) is located at a position on the left side on the large screen size at 405A, but at 405B-C above the content C on the mid-sized screen size or the small screen size. Moreover, the sub content B1, B2, and B3 are in a vertical layout at the large screen size user intention 405A as well as on the small screen size user intention 405C. In addition, the sub content B1, B2, and B3 are in a horizontal layout on the mid-sized screen size user intention 405B. And, the content C is on the right on the large screen size user intention 405A, and above the content D on the mid-sized screen size or the small screen size user intentions 405B-C. Although this example illustrates user intention with respect to the placement of specific content layout, it is merely an example as other content layouts may be implemented as well.

Figure 5A:
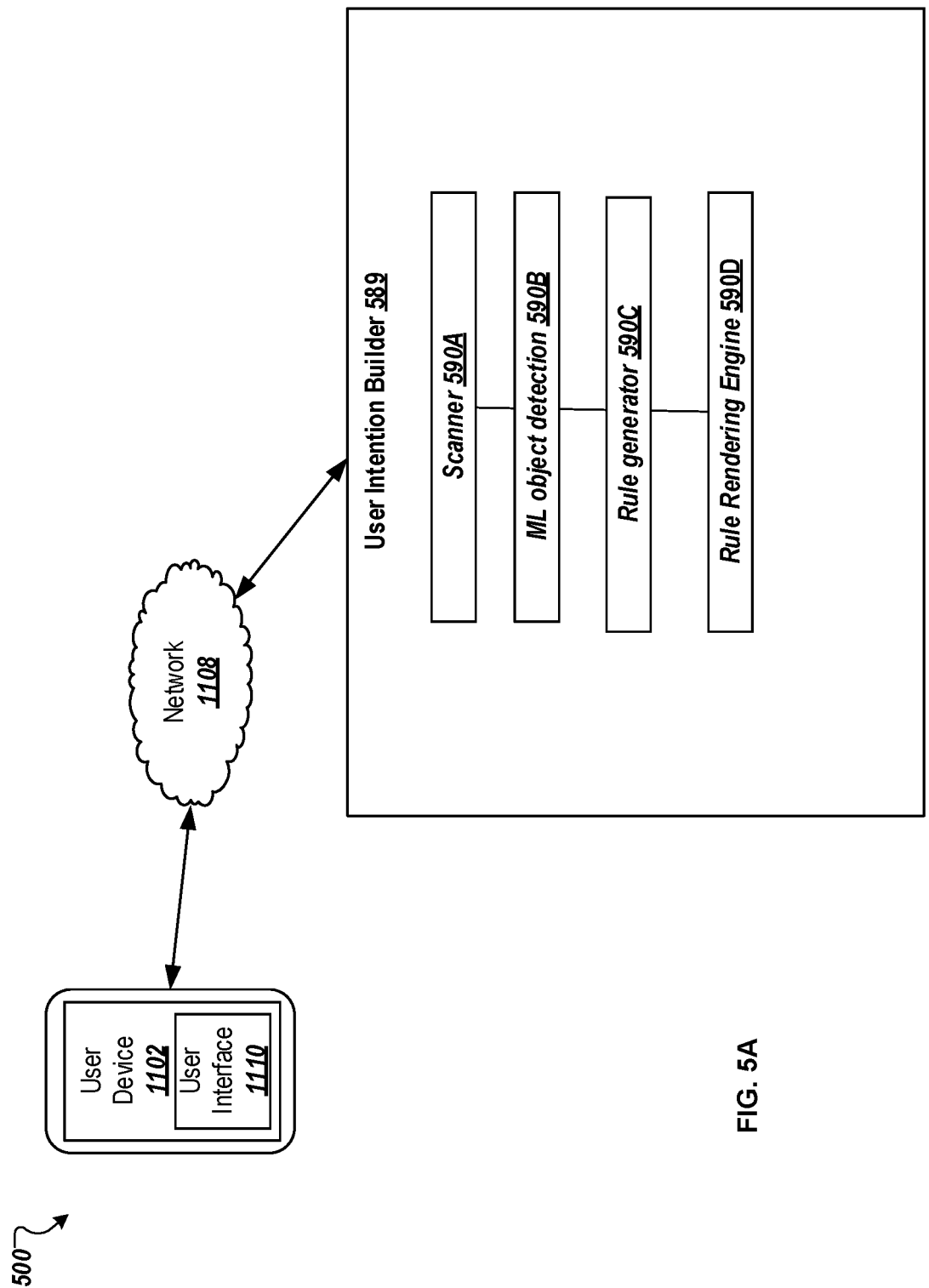
FIG. 5A depicts an example of a user intention builder, in accordance with some embodiments.

FIG. 5A depicts an example of a system 500 for user intention based responsive design, in accordance with some embodiments. The system may also be referred to herein as a "user intention builder."

The system 500 may include a user intention builder 589, which further includes a scanner 590A to scan a drawing or sketch of a user intention into an electronic version of the user intention, an ML model object detector to detect the objects in the user intention, a rules engine 590C to generate responsive rules, and a rules rendering engine 590D which generates code that generates the user interface based on the responsive rules. The system 500 may also include at least one user device 1102 including a user interface 1110 to enable access, via network, 1108, of the user intention builder 589.

The user device 1102 can interact with the user intention builder 589 via network 1108 to create, identify, and/or modify user intentions and to generate responsive rules that can be rendered to provide responsive designs of a user interface that are operable across different display sizes. The user device 1102 can be and/or include any type of processor and memory based device, such as, for example, cellular phones, smart phones, tablet computers, laptop computers, desktop computers, workstations, personal digital assistants (PDA), network appliances, cameras, media players, navigation devices, email devices, game consoles, or an appropriate combination of any two or more of these devices or other data processing devices. The user device 1102 can include any combination of fixed and variable computing components. Even though, not illustrated, in some implementations, multiple user devices 1102 including different computing system configurations, such as different operating systems, different processing capabilities, different hardware components, and/or other differences can concurrently access the user intention builder 589.

The network 1108 may be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The user intention builder 589 may be hosted on any form of servers including a web server (e.g., cloud-based server), an application server, a proxy server, a network server, and/or a server pool.

Figure 5B:
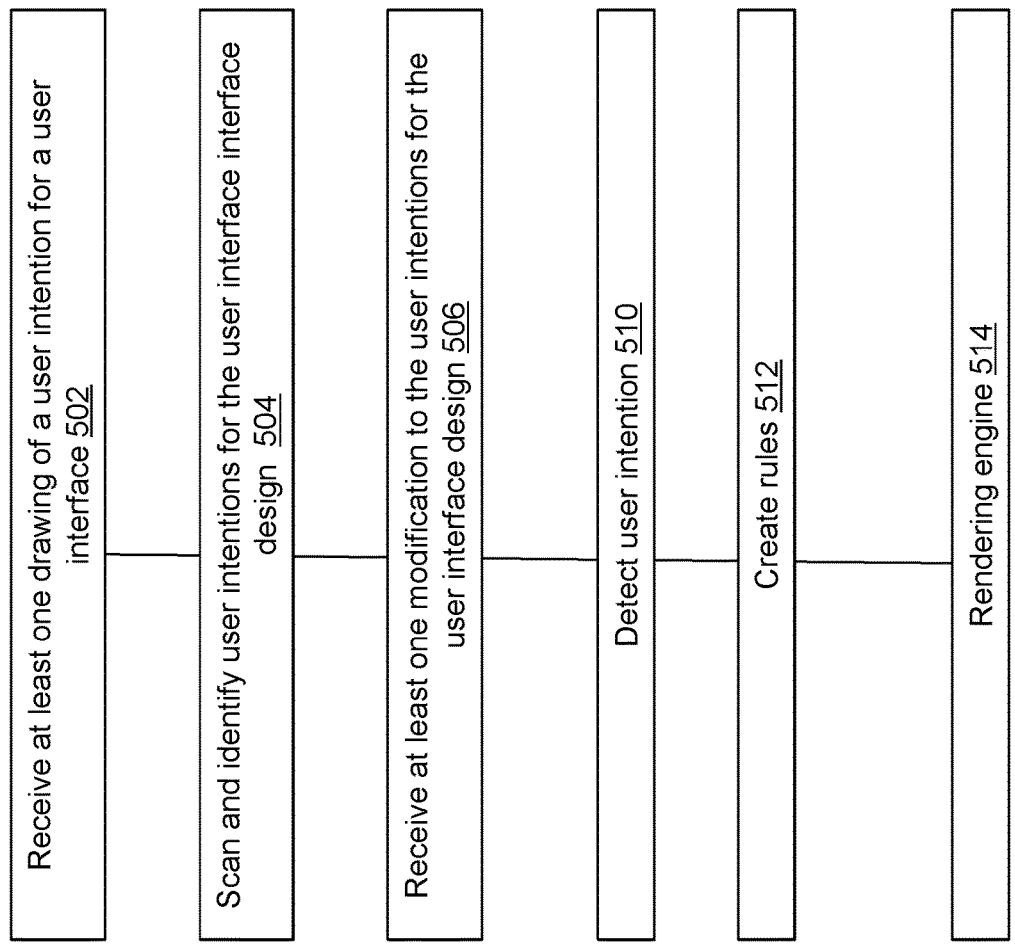
FIG. 5B depicts an example of a process for generating responsive designs, in accordance with some embodiments.

FIG. 5B depicts an example of a process for generating responsive designs, in accordance with some embodiments. The process may transform user intentions into computer commands that create responsive rules that can be applied to layout components on the user interfaces.

At 502, at least one drawing of at least one user intention may be received. For example, the user intentions 405A-C may be received in the form of a sketch as shown at FIG. 4A. The sketch 405A-C may be hand drawn as shown at FIG. 4A or drawing electronically using a drawing tool. The drawings of the user intentions may be received by the system 500, such as the user intention builder 589.

Figure 6A:
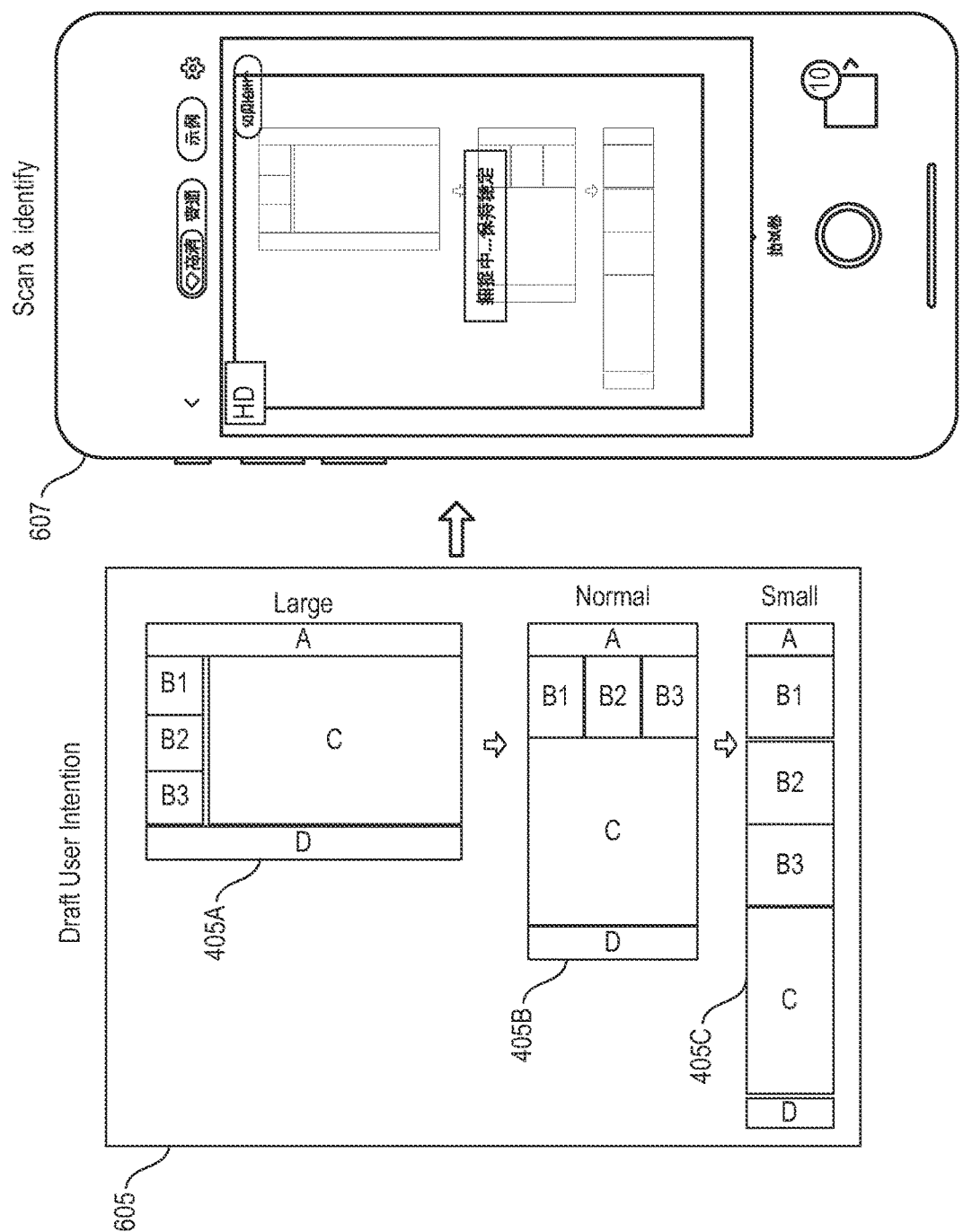
FIG. 6A depicts an example of scanning user intentions, in accordance with some embodiments.

In the case that the user intentions are received as a drawing at 502, the at least one drawing of the at least one user intention may be scanned, at 504, by the system 500 into an electronic form and then processed to identify the user intentions. Referring to FIG. 6A, the drawing 605 of the user intentions 405A-C may be scanned by a user device 607 (or at the scanner 590A or the user device 1102) as part of the user intentions identification process. For example, a scanning application at the user device 607/1102 or the scanner 590A may perform the scanning.

Referring again to FIG. 5A at 504, the objects of the user intentions may also be identified. For example, the objects of the user intentions may be detected using machine learning (ML). In the example of FIG. 6D1, the objects being detected include shapes (e.g., boxes, rectangles, etc.) with labels (e.g., A, B, etc.), size of the shapes and labels, and the position of each of the objects. For example, the ML model 590B (FIG. 5A) may be used to detect the objects in the drawing 605. In this example, the ML model 590B may detect an object such as the rectangle and the text A. The ML model may also map the rectangle and content A to metadata (which is stored at the user intention builder 589). This metadata may indicate that content A corresponds to a certain content, such as content 102A or other type of panel, widget, user interface element, and/or the like. The ML model may comprise a neural network, such as a convolutional neural network (CNN), although other types of ML models may be used. For example, the CNN may be used to detect and identify objects, such as the rectangle and the text A. The identified object may then be mapped to metadata indicating certain content the object maps to.

Alternatively, or additionally, the ML model 590B may comprise a deep learning ML model using regions with convolutional neural networks (R-CNN), which combines rectangular region proposals with convolutional neural network features. R-CNN is a two-stage detection algorithm with a first stage that identifies a subset of regions in an image that might contain an object and a second stage classifies the object in each region.

Figure 6B:
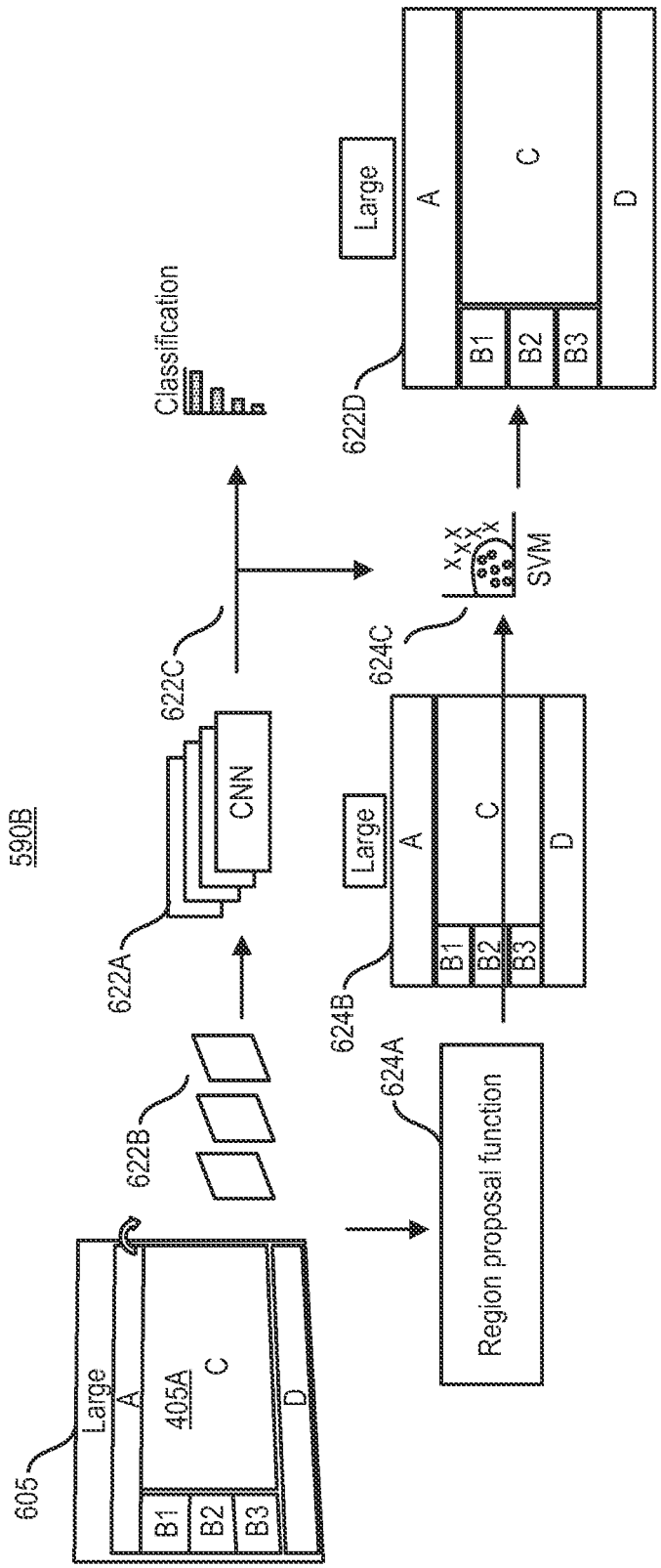
FIG. 6B depicts an example of a machine learning model being used for object detection, in accordance with some embodiments.

FIG. 6B depicts an example of the ML model 590B which includes a CNN 622 receiving one or more portions (e.g., patches 622B) of the drawing 605 containing the user intention drawing 405A. In the example of FIG. 6B. one or more CNNs 622A output 622C provides a classification of the objects at the drawing 605. For example, the classification may indicate what each of the objects of the user intention 405 correspond to, such as "Large", box A, box B1, box B2, box B3, box C, and Box D. The ML model (or other element of the user intention builder 589) may also map the rectangle and content A to metadata (which is stored at the user intention builder 589). Moreover, an ML model 624A (which in this example is a regional proposal function also referred to region proposal network) may be applied to the user intention 405A to detect the objects and their relative position. A regional proposal function may be implemented as a fully connected convolutional network that predicts object bounds (e.g., edges of objects as shown at 624B) and objectness scores (which indicate a distance measurement between the object and a class of the object) at each position as shown at 624C, which is then applied to form the detected objects at 622D as shown at FIG. 6B. Referring to 6B, although FIG. 6B provides an example of the ML model to detect the objects in the user intention and the object locations, other types of ML models may be used as well.

Referring again to FIG. 5A at 506, at this stage the user intention builder 580 has the identity of the objects and object locations of the user intentions. At this point, the user intention builder may allow the user intentions to be modified. For example, the user intention builder may be used by an end-user (accessing via user device 1102) to modify the objects of the user intentions 405A-C. For example, the user intention builder may present (at user device 1102 and user interface 1110) the user intentions as shown at FIG. 6A at 607 and allow an end-user to modify the user intentions. Moreover, the user intention builder may include definitions for the sizes (e.g., the thresholds defining the different sizes of screens for each of the user intentions) and these sizes may also be modified.

Figure 6C:
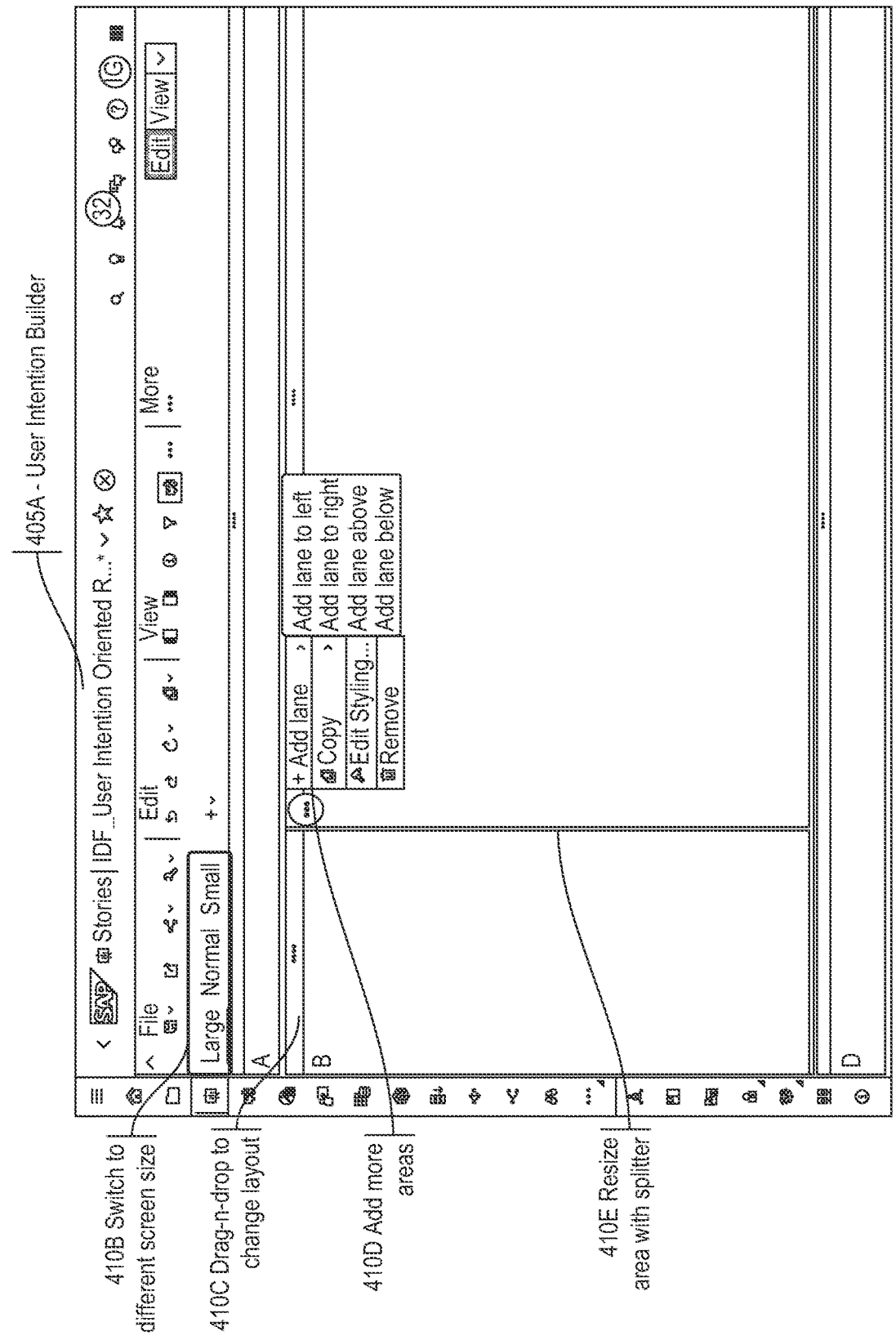
FIG. 6C depicts an example where the user intention builder is used to modify the user intention, in accordance with some embodiments.

FIG. 6C depicts an example where the user intention builder 589 is used to modify the user intention 405A. In this example, the modification 410A adds an element to the user interface at a location (e.g., above, right of, left of, or below the icon at 410A at add "Lane" which adds content such that it is constrained to where it is placed). Alternatively, or additionally, a modification may be performed on each of the user intentions 405A-C by switching at 410B between the different screen sizes and then adjusting the content layout, such as the positions of the content A, content B, etc. In the example of FIG. 6C, the "large" user intention corresponding to 405A has been selected. Alternatively, or additionally, a user may at 410C move (e.g., with a drag and drop) the location (or position) of content areas (e.g., content A, content B, and so forth) to change the layout for specific screen size. Alternatively, or additionally, a user may, at 410D, add areas or add sub areas for additional content. The user may also set one area as invisible (for example, when viewing on small screen size). Alternatively, or additionally, the user may, at 410E, resize area (e.g., with a splitter).

Alternatively, or additionally, the user intention builder 500 may be used to create the content layout depicted at 405A-C, for example, as well as to modify the content layout, such as the placement of content A, content B, etc. When this is the case, the receiving 502 and/or scanning and identification 504 may not be performed by the user intention builder 589.

At 510-514, the user intentions are detected, rules are created, and the rules are rendered. For example, the user intentions are detected, so the content layout, such as the placement of content A, content B, etc. are detected. To illustrate further, area B is displayed as 30% width on large screen and 100% width on normal 405A or small screen 405C. Inside area B, the contained content B1/B2/B3 are displayed as 100% width of area B on small screen (e.g., screen width is less than 460 pixels) and 33% width of area B on normal screen (e.g., screen width is less than 820 pixels).

At 512, the user intention builder 500 may generate responsive rules (or rules, for short) for the user intentions. For example, the rules generator 590C may generate rules that define the layout of the component for each of the user intentions.

FIG. 6D1 depicts an example of how the rules (which are responsive to the different screen sized) layout the content for the user interface components. At 677A, the components (e.g., objects, such as content A, content B, and/or other user interface elements) that may be used in a given user interface layout may be listed on the left panel at 677A as shown. In the example, Panel_B is selected which maps to a specific content (e.g., content B) or panel of user interface content, such as objects, user interface elements, and/or other content. In the example, Panel_B is a container widget used for layout. When a component is selected (via the user interface) such as Panel_B, the responsive rules for the selected component opens at 677B (see Responsive Rules Configuration panel). In this example, the relevant responsive rules are shown at 677C-D as Rule 1 and 105—Rule 2, where responsive Rule 1 sets a threshold of 460 pixels or less (in which case the widget of content B is set to a certain height (112 pixels) and width (e.g., 100%) and responsive Rule 2 sets a threshold of 820 pixels but greater than 460 (in which case the widget of content B is set to a certain height (112 pixels) and width (e.g., 33%). The user may modify these rules or add more rules. At FIG. 6D2, the content of Panel B (which is also shown at FIG. 6D1) is shown including three chart widgets, which in this example are Chart_B1, Chart_B2 and Chart_B3.

FIG. 6E depicts two rules 677C-D generated for Panel B. The first rule (Rule 1) 677C includes a condition 677F for Rule 1. Here, the rule defines a small screen size, when the screen width is less than 460 pixels. Rule 1 also includes a layout configuration 677G for Rule 1. Here, it will set the contained content to 100% width and 112 pixel height for each widget. The term widget refers to the sub components contained by Panel B, such as Chart_B1 679A, Chart_B2 679B and Chart_B3 679C s. The layout configuration may also hide a widget if a user selects "Hide the widgets" as shown at FIG. 6E. With respect to Rule 2 677D, it includes a condition 677H that defines a normal (or mid-sized) screen size when the screen width is less than 820 pixels and greater than 460 pixels. Rule 2 also includes a layout configuration 677I that specifies the contained content to 33% width and 112 pixel height for each widget. By selecting at 606 Add Breakpoint, one or more additional rules may be added, such as a rule defining the condition that defines a large screen size as well as other screen sizes. These rules may be stored at the user intention builder 589. In other words, the Rules 677C-D define the conditions that trigger the responsive design of the UI to different physical screens.

Figure 7:
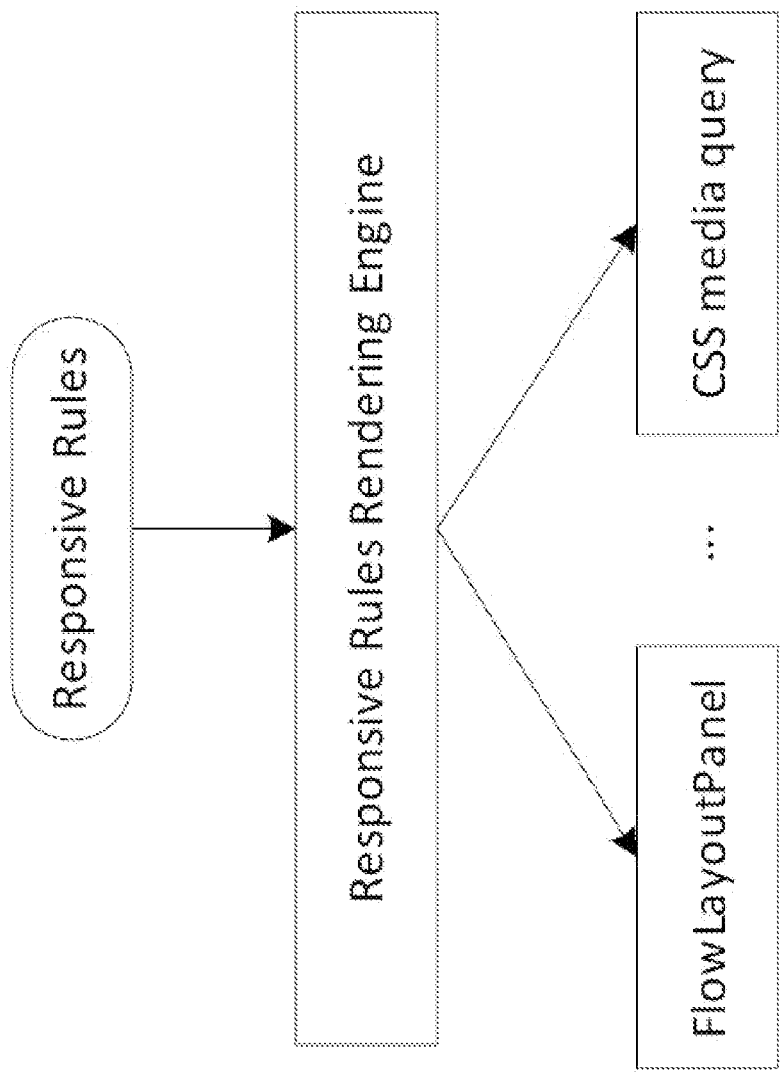
FIG. 7 depicts an example of the rendering engine generating a rendering of the user interface, in accordance with some embodiments.

Referring again to FIG. 5B at 514, the rules are rendered. For example, the rules rendering engine 590D may be used to render the rules. To illustrate further, the rules rendering engine converts the responsive rules into different implementations based on different technologies used. In the case of SAP Analytics Cloud application, a flow layout panel renders the content according to the rules. The flow panel may be generated as a container widget that allows user interface elements to automatically flow to the proper position. Alternatively, or additionally, the rules may be generated (e.g., converted into) a markup language, such as cascading style sheets (CSS) 3 media query that can be rendered by a browser. FIG. 7 depicts the rules engine rendering the rules based on the flow panel rendering technique or CSS media queries.

In some implementations, the current subject matter may be configured to be implemented in a system 800, as shown in FIG. 8. For example, the client refresh controller 190, system landscape, databases, and/or other aspects disclosed herein may be at least in part physically comprised on system 800. To illustrate further system 800 may further an operating system, a hypervisor, and/or other resources, to provide virtualize physical resources (e.g., via virtual machines). The system 800 may include a processor 810, a memory 820, a storage device 830, and an input/output device 840. Each of the components 810, 820, 830 and 840 may be interconnected using a system bus 850. The processor 810 may be configured to process instructions for execution within the system 800. In some implementations, the processor 810 may be a single-threaded processor. In alternate implementations, the processor 810 may be a multi-threaded processor.

The processor 810 may be further configured to process instructions stored in the memory 820 or on the storage device 830, including receiving or sending information through the input/output device 840. The memory 820 may store information within the system 800. In some implementations, the memory 820 may be a computer-readable medium. In alternate implementations, the memory 820 may be a volatile memory unit. In yet some implementations, the memory 820 may be a non-volatile memory unit. The storage device 830 may be capable of providing mass storage for the system 800. In some implementations, the storage device 830 may be a computer-readable medium. In alternate implementations, the storage device 830 may be a floppy disk device, a hard disk device, an optical disk device, a tape device, non-volatile solid state memory, or any other type of storage device. The input/output device 840 may be configured to provide input/output operations for the system 800. In some implementations, the input/output device 840 may include a keyboard and/or pointing device. In alternate implementations, the input/output device 840 may include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A computer-implemented method, comprising: identifying, from an electronic drawing, at least one object and at least one object location in at least one user intention for a user interface that is responsive across a plurality of screen sizes, wherein the at least one object and the at least one object location are identified using a machine learning model; creating responsive rules for the at least one object and at least one object location detected in the at last one user intention; and rendering, based on the responsive rules, the user interface, such that the responsive rules configure content layout in the user interface in response to a screen size displaying the user interface.

Example 2: The computer-implemented method of Example 1, wherein the at least one user intention defines at least a placement of a content within the user interface, wherein the content comprises a widget, a user interface element, and/or a user interface object.

Example 3: The computer-implemented method of any of Examples 1-2 further comprising: receiving a drawing of the at least one user intention for the user interface that is responsive across a plurality of screen sizes; and scanning the drawing into the electronic drawing of the at least one user intention for the user interface that is responsive across the plurality of screen sizes.

Example 4: The computer-implemented method of any of Examples 1-3, wherein the scanning is performed by a user intention builder.

Example 5: The computer-implemented method of any of Examples 1-4 further comprising: receiving an electronic drawing of the at least one user intention for the user interface that is responsive across the plurality of screen sizes.

Example 6: The computer-implemented method of any of Examples 1-5, wherein the machine learning model identifies the at least one object using a convolutional neural network.

Example 7: The computer-implemented method of any of Examples 1-6, wherein the machine learning model comprises a regional proposal network to identify the at least one object and the at one location.

Example 8: The computer-implemented method of any of Examples 1-7 further comprising: receiving at least one modification to the at least one user intention, wherein the modification comprises a change in a location of the at least one object within the user interface.

Example 9: The computer-implemented method of any of Examples 1-8, wherein the at least one object comprises a shape, a label, a size of the shape, a size of the label, and/or a position for the objects.

Example 10: The computer-implemented method of any of Examples 1-9, wherein the rendering comprises generating a container widget based on the responsive rules.

Example 11: The computer-implemented method of any of Examples 1-10, wherein the rendering comprises generating a cascading style sheet based on the responsive rules.

Example 12: A system comprising: at least one processor; and at least one memory, which when executed by the at least one processor causes operations comprising: identifying, from an electronic drawing, at least one object and at least one object location in at least one user intention for a user interface that is responsive across a plurality of screen sizes, wherein the at least one object and the at least one object location are identified using a machine learning model; creating responsive rules for the at least one object and at least one object location detected in the at last one user intention; and rendering, based on the responsive rules, the user interface, such that the responsive rules configure content layout in the user interface in response to a screen size displaying the user interface.

Example 13: The system of Example 12, wherein the at least one user intention defines at least a placement of a content within the user interface, wherein the content comprises a widget, a user interface element, and/or a user interface object.

Example 14: The system method of any of Examples 12-13 further comprising: receiving a drawing of the at least one user intention for the user interface that is responsive across a plurality of screen sizes; and scanning the drawing into the electronic drawing of the at least one user intention for the user interface that is responsive across the plurality of screen sizes.

Example 15: The system of any of Examples 12-14, wherein the scanning is performed by a user intention builder.

Example 16: The system of any of Examples 12-15 further comprising: receiving an electronic drawing of the at least one user intention for the user interface that is responsive across the plurality of screen sizes.

Example 17: The system of any of Examples 12-16, wherein the machine learning model identifies the at least one object using a convolutional neural network.

Example 18: The system of any of Examples 12-17, wherein the machine learning model comprises a regional proposal network to identify the at least one object and the at one location.

Example 19: The system of any of Examples 12-18 further comprising: receiving at least one modification to the at least one user intention, wherein the modification comprises a change in a location of the at least one object within the user interface.

Example 20: A non-transitory computer-readable medium including instructions which when executed by at least one processor causes operations comprising: identifying, from an electronic drawing, at least one object and at least one object location in at least one user intention for a user interface that is responsive across a plurality of screen sizes, wherein the at least one object and the at least one object location are identified using a machine learning model; creating responsive rules for the at least one object and at least one object location detected in the at last one user intention; and rendering, based on the responsive rules, the user interface, such that the responsive rules configure content layout in the user interface in response to a screen size displaying the user interface.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    identifying, from an electronic drawing, at least one object and at least one object location in at least one user intention for a user interface that is responsive across a plurality of screen sizes, wherein the at least one object and the at least one object location are identified using a machine learning model;
    transforming the at least one user intention into one or more computer commands;
    mapping the at least one object and the at least one object location to at least one content;
    creating, by the one or more computer commands, responsive rules for the at least one object and the at least one object location detected in the at least one user intention, wherein the responsive rules define at least one layout for at least one component to display the at least one content within the user interface across the plurality of screen sizes, and wherein the responsive rules define a plurality of thresholds for the plurality of screen sizes for the at least one user intention;
    presenting, by a user intention builder, a graphical depiction of the responsive rules including the plurality of thresholds, wherein a user is allowed to modify the plurality of thresholds via the user intention builder; and
    rendering, based on the responsive rules, the user interface, such that the responsive rules configure the layout of the at least one component within the user interface in response to a screen size displaying the user interface.

2. The computer-implemented method of claim 1, wherein the at least one user intention defines at least a placement of the at least one content within the user interface, wherein the content comprises a widget, a user interface element, and/or a user interface object, and wherein the user interface hides at least one widget in response to detecting a corresponding hide the widget selection.

3. The computer-implemented method of claim 1, further comprising:
receiving a drawing of the at least one user intention for the user interface that is responsive across the plurality of screen sizes; and
scanning the drawing into the electronic drawing of the at least one user intention for the user interface that is responsive across the plurality of screen sizes.

4. The computer-implemented method of claim 1, wherein the responsive rules further define a width and a height of the at least one content corresponding to each of the plurality of thresholds, and wherein the user is further allowed to modify the width and the height of the at least one content corresponding to each of the plurality of thresholds via the user intention builder.

5. The computer-implemented method of claim 1, further comprising:
receiving the electronic drawing of the at least one user intention for the user interface that is responsive across the plurality of screen sizes.

6. The computer-implemented method of claim 1, further comprising storing, at the user intention builder, a mapping of the at least one object and the at least one object location to the at least one content.

7. The computer-implemented method of claim 1, wherein the machine learning model identifies the at least one object using a convolutional neural network.

8. The computer-implemented method of claim 1, wherein the machine learning model comprises a regional proposal network to identify the at least one object and the at least one object location.

9. The computer-implemented method of claim 1, further comprising:
presenting, by the user intention builder, a first user intention and allowing a user to modify the first user intention;
presenting, by the user intention builder, definitions of a plurality of sizes defining different sizes of screens for each user intention of a plurality of user intentions;
allowing, by the user intention builder, the user to modify definitions of different screen sizes for the plurality of user intentions;
receiving at least one first modification to the first user intention, wherein the at least one first modification comprises a change in a location of the at least one component within the user interface; and
receiving a second modification to a first definition of a first size defining a first screen size for the first user intention.

10. The computer-implemented method of claim 1, wherein the at least one object comprises a shape, a label, a size of the shape, a size of the label, and/or a position of the at least one object.

11. The computer-implemented method of claim 1, wherein the rendering comprises generating a container widget based on the responsive rules.

12. The computer-implemented method of claim 1, wherein the rendering comprises generating a cascading style sheet based on the responsive rules.

13. A system comprising:
at least one processor; and
at least one memory, which when executed by the at least one processor causes operations comprising:
identifying, from an electronic drawing, at least one object and at least one object location in at least one user intention for a user interface that is responsive across a plurality of screen sizes, wherein the at least one object and the at least one object location are identified using a machine learning model;
transforming the at least one user intention into one or more computer commands;
mapping the at least one object and the at least one object location to at least one content;
creating, by the one or more computer commands, responsive rules for the at least one object and the at least one object location detected in the at least one user intention, wherein the responsive rules define at least one layout for at least one component to display the at least one content within the user interface across the plurality of screen sizes, and wherein the responsive rules define a plurality of thresholds for the plurality of screen sizes for the at least one user intention;
presenting, by a user intention builder, a graphical depiction of the responsive rules including the plurality of thresholds, wherein a user is allowed to modify the plurality of thresholds via the user intention builder; and
rendering, based on the responsive rules, the user interface, such that the responsive rules configure the layout of the at least one component within the user interface in response to a screen size displaying the user interface.

14. The system of claim 13, wherein the at least one user intention defines at least a placement of the at least one content within the user interface, wherein the content comprises a widget, a user interface element, and/or a user interface object, and wherein the user interface hides at least one widget in response to detecting a corresponding hide the widget selection.

15. The system of claim 13, further comprising:
receiving a drawing of the at least one user intention for the user interface that is responsive across the plurality of screen sizes; and
scanning the drawing into the electronic drawing of the at least one user intention for the user interface that is responsive across the plurality of screen sizes.

16. The system of claim 13, wherein the responsive rules further define a width and a height of the at least one content corresponding to each of the plurality of thresholds, and wherein the user is further allowed to modify the width and the height of the at least one content corresponding to each of the plurality of thresholds via the user intention builder.

17. The system of claim 13, further comprising:
receiving the electronic drawing of the at least one user intention for the user interface that is responsive across the plurality of screen sizes.

18. The system of claim 13, wherein the machine learning model identifies the at least one object using a convolutional neural network.

19. The system of claim 13, wherein the machine learning model comprises a regional proposal network to identify the at least one object and the at one location.

20. A non-transitory computer-readable medium including instructions which when executed by at least one processor causes operations comprising:
- identifying, from an electronic drawing, at least one object and at least one object location in at least one user intention for a user interface that is responsive across a plurality of screen sizes, wherein the at least one object and the at least one object location are identified using a machine learning model;
- transforming the at least one user intention into one or more computer commands;
- mapping the at least one object and the at least one object location to at least one content;
- creating, by the one or more computer commands, responsive rules for the at least one object and the at least one object location detected in the at least one user intention, wherein the responsive rules define at least one layout for at least one component to display the at least one content within the user interface across the plurality of screen sizes, and wherein the responsive rules define a plurality of thresholds for the plurality of screen sizes for the at least one user intention;
- presenting, by a user intention builder, a graphical depiction of the responsive rules including the plurality of thresholds, wherein a user is allowed to modify the plurality of thresholds via the user intention builder; and
- rendering, based on the responsive rules, the user interface, such that the responsive rules configure the layout of the at least one component within the user interface in response to a screen size displaying the user interface.

* * * * *